United States Patent [19]

Bissinger, Sr.

[11] 3,827,752

[45] Aug. 6, 1974

[54] PROTECTION UNITS FOR THE SEATS OF SCHOOL BUSES AND THE LIKE

[76] Inventor: Charles Clarence Bissinger, Sr., 224 Compton Ridge Dr., Cincinnati, Ohio 45215

[22] Filed: Feb. 13, 1973

[21] Appl. No.: 332,071

[52] U.S. Cl. ................. 297/452, 297/216, 297/219, 297/390

[51] Int. Cl. ................................................ A47c 7/02

[58] Field of Search ........... 297/216, 218, 219, 223, 297/226, 230–232, 243, 384, 390, 452, 455, 456; 280/150 B, 150 AB

[56] References Cited

UNITED STATES PATENTS

| | | | |
|---|---|---|---|
| 1,885,109 | 11/1932 | Burkhart | 297/219 X |
| 2,251,318 | 8/1941 | Blair et al. | 297/455 X |
| 2,867,266 | 1/1959 | Vogler | 297/219 |
| 2,952,304 | 9/1960 | Pinkel | 297/455 X |
| 3,292,973 | 12/1966 | Cogut | 297/231 X |

FOREIGN PATENTS OR APPLICATIONS

| | | | |
|---|---|---|---|
| 1,903,731 | 8/1970 | Germany | 297/454 |

*Primary Examiner*—James C. Mitchell
*Attorney, Agent, or Firm*—John W. Melville; Albert E. Strassen; Stanley H. Foster

[57] ABSTRACT

A protection unit for the seat of a vehicle such as a school bus or the like wherein the seat comprises a metallic frame supporting upholstered or fiber glass back and seat portions. The protection unit comprises a layer of energy absorbing material and an outer layer of appropriate upholstery material configured to cover at least the upper portion (and preferably substantially all) of that portion of the exposed seat frame supporting the seat back. The protection unit may be rapidly and easily installed without removing the seat from the vehicle.

12 Claims, 9 Drawing Figures

PATENTED AUG 6 1974 3,827,752

PROTECTION UNITS FOR THE SEATS OF SCHOOL BUSES AND THE LIKE

BACKGROUND OF THE INVENTION

1. Field of the Invention

The invention relates to a protective unit for a vehicle seat, and more particularly to a protective unit configured to cover a portion or all of the exposed seat back supporting frame of a school bus seat or the like.

2. Description of the Prior Art

The protective units of the present invention may have many applications. For example, they may be used in conjunction with many types of seats found in private and commercial vehicles. While not intended to be so limited, for purposes of an exemplary showing the protective units of the present invention will be described in their application to a bench-type vehicle seat typically used in school buses.

For many years much attention has been given to the development and promulgation of safety rules and traffic laws relating to school buses. Only relatively recently, however, has attention been turned to the interior construction of school buses with an eye toward the safety of the children therein, not only during normal operation of the bus, but also at times of sudden stops or accidents.

Typically, school buses have been provided with bench-type seats extending transversely of the vehicle body and one behind the other in longitudinal rows. Heretofore, the usual school bus seat has comprised a metallic framework (generally of welded tubular steel or the like) supporting upholstered or fiber glass seat back and seat bottom portions. While such seats are adequately contoured or upholstered for the comfort of those sitting on them, the metallic seat back supporting frame is exposed to those sitting in a seat behind. Frequently, the metallic seat back supporting frame also encloses a metallic panel providing a mar-resistant rearward surface for the seat.

One of the primary sources of injury in a school bus results from impact of a portion of a child's body with the exposed seat back supporting frame of the seat ahead of him (and the metallic panel portion thereof, if present). While such impact can occur during ordinary operation of the school bus through the inadvertence or carelessness of the child, a particularly serious condition arises during instances of accident involving the school bus or conditions requiring the school bus to be brought to a sudden stop.

This problem has become well recognized today and many cities and states have, or are in the process of, establishing rules regulating the construction of school bus seats. As a result, most bus seat manufacturers are now providing school bus seats, the frame portions of which (and particularly those frame portions supporting the seat back) are fully padded to meet the new safety standards. Thus, in many brand new school buses the problem to which the present invention is directed has been obviated. Unfortunately, however, there are literally thousands of existing school buses which do not meet the new safety standards. As a result, many communities are faced with the prospect of either replacing all of the seats in their existing school buses with new ones that meet the safety standards, or rebuilding the existing seats to bring them within the purview of the new safety standards. Neither of these solutions to the problem is particularly satisfactory. On the one hand, the replacing of all the existing seats with new ones is an extremely expensive proposition. On the other hand, the rebuilding of existing seats, where possible, may even be more expensive and is extremely time consuming.

Prior art workers have devised a number of protective means for school bus seats, but none of them has been wholly adequate. Fr example, padded cover members have been applied to the upper portion of school bus seat backs to cover the uppermost horizontal seat frame element. Such devices will minimize head and mouth injuries of a child as the result of impact with the upper portion of the seat back ahead of him (or across from him), but they do not protect his body from injuries as the result of impact with the remainder of the seat back and frame including the side members of the frame.

The present invention is directed to a protective unit which, with minor modifications, may be applied to a wide variety of school bus seats. The protective unit of the present invention provides a layer of energy absorbing material and an outer layer of appropriate upholstery material so configured as to cover not only the upper horizontal seat back frame member, but also the vertical portions thereof and the seat back structure therebetween, whether it be a metallic panel or simply the hard surface of the seat back itself. In its preferred form, the protective unit also extends about the lower horizontal portion of the seat frame to protect against injury to knees, legs, ankles, shins and feet. The protective unit is inexpensive and may be easily and rapidly installed. For example, a single workman can install the protective units of the present invention to all of the seats of a conventional school bus within a matter of two or three hours. As the result of such installation, the existing seats of a school bus can be made to meet the new safety standards without the necessity of replacing or rebuilding them.

SUMMARY OF THE INVENTION

The protective unit of the present invention is directed to school bus seats or the like of the type comprising a metallic frame supporting upholstered or fiber glass bottom and seat back portions. The protective unit provides a layer of energy absorbing material and an outer layer of appropriate upholstery material configured to cover at least the upper portion and preferably substantially all of that part of the exposed seat frame supporting the seat back.

In one embodiment, an inner layer of heavy, flexible material and an outer layer of appropriate, tough, upholstery material are joined together on three sides to form an envelope. The envelope is adapted to receive an intermediate layer of energy absorbing material. Grommets, passing through all three layers, are provided at positions in the structure conforming to the positions of the screws attaching the seat back to the seat frame. The protective unit is affixed to the seat frame by means of the same screws which attach the seat back to the seat frame, these screws passing through the grommets provided in the unit. Edgemost portions of the unit are folded about the upper horizontal portion and the vertical portions of the seat back supporting frame so that when assembly is complete, these edge portions lie between the seat back and the seat back supporting frame. Means may also be provided to assist in the proper fitting of the unit at the upper corners of the seat frame.

When desired, the lower edge of the inner layer of heavy flexible material and the lower edge of the outer layer of tough upholstery material may be joined together with grommets. Under these circumstances, the lowermost edge of the unit (including the energy absorbing layer) may be folded beneath and forwardly of the lower horizontal portion of the seat back supporting frame and attached beneath the seat by appropriate fastening means engaging the last mentioned grommets.

In a second embodiment of the present invention a sheet or layer of energy absorbing material is provided of such size as to span the seat back supporting frame and to wrap about the vertical side and upper and lower horizontal portions thereof. Means are provided to initially hold the sheet of energy absorbing material in place on the back of the seat back supporting frame. Front and rear panels of appropriate, tough, upholstery material are joined together on three sides to form an envelope. This envelope is placed over the seat back, seat back supporting frame and the layer of energy absorbing material with the front panel of the envelope lying adjacent the seat back and the rear panel of the envelope lying adjacent the layer of energy absorbing material. The front panel of the upholstery material envelope has a lower edge extending slightly below the lower edge of the seat back and provided with male snap fastener elements. The lower edge of the back panel of the upholstery material is elongated so as to provide a flap which extends beneath the lower horizontal portion of the seat back supporting frame and which overlies the lower edge of the front panel. The rear panel flap portion is provided with female snap fastener elements adapted to engage the above mentioned male snap fastener elements so as to hold the assembly in place. These snap fastener elements are covered by the seat bottom portion of the school bus seat when it is affixed to its supporting frame. An intermediate envelope of polyethylene film may be placed over the seat back, seat back supporting frame and layer of energy absorbing material to assist in the mounting of the envelope of upholstery material.

DESCRIPTION OF THE PREFERRED EMBODIMENTS

Figure 1:
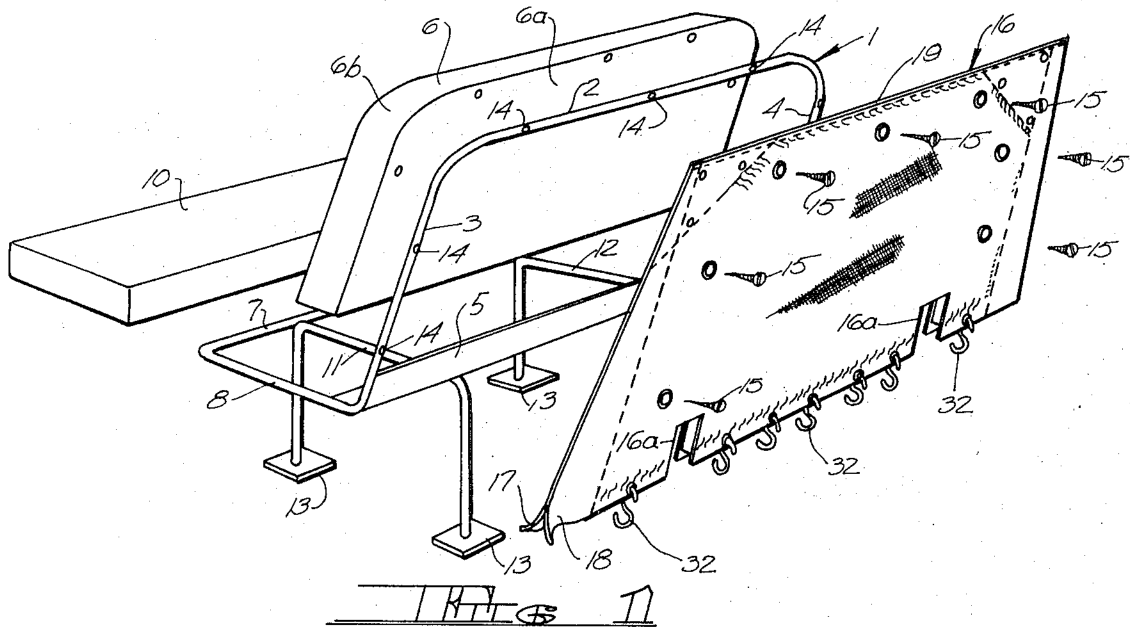
FIG. 1 is an exploded perspective view illustrating a conventional school bus seat and one embodiment of the protective unit of the present invention.

FIG. 1 illustrates an exemplary embodiment of a school bus bench-type seat. The school bus seat comprises a welded tubular steel frame generally indicated at 1. The frame has an upper horizontal portion 2 and downwardly depending side portions 3 and 4 which are welded, or otherwise affixed to a lower horizontal element 5 of substantially L-shaped cross section. The frame elements 2 through 5 are adapted to support the seat back 6.

In similar fashion, a forwardmost horizontal portion 7 of the frame has rearward horizontally extending portions 8 and 9 (see FIG. 4) which are welded or otherwise affixed to the rear horizontal frame element 5. The frame portions 7 through 9 and the element 5 are intended to support the seat bottom 10. It will be understood that the tubular frame portions 2 through 4 and 7 through 9 may constitute an integral one piece structure welded or otherwise affixed to the frame element 5.

The frame portions thus far described are supported on leg elements 11 and 12. The leg elements 11 and 12 are substantially identical and comprise tubular, inverted U-shaped frame members the downwardly depending legs of which constitute the vehicle seat legs and terminate in mounting plates 13. The members 11 and 12 are welded or otherwise affixed at their corners to the frame portion 7 and the element 5.

The seat back 6 comprises a back panel **6*a* and an upholstered portion 6*b*. The precise nature and construction of the seat back 6 does not constitute a limitation on the present invention. It will be noted that the frame elements 2 through 4 are provided with transverse perforations 14 for the receipt of screws 15. The screws 15 are adapted to extend through the transverse frame perforations 14 and into the back panel 6*a* of the seat back, firmly affixing the seat back to the frame. It will be understood that the seat bottom 10 may be similarly constructed and similarly affixed to the seat frame. The precise construction of the seat bottom 10** again does not constitute a limitation on the present invention.

Figure 2:
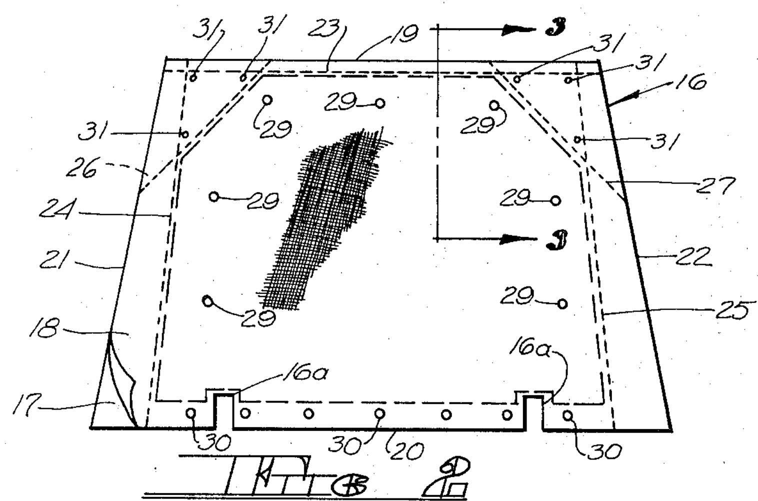
FIG. 2 is an elevational view of the protective unit of FIG. 1.
Figure 3:
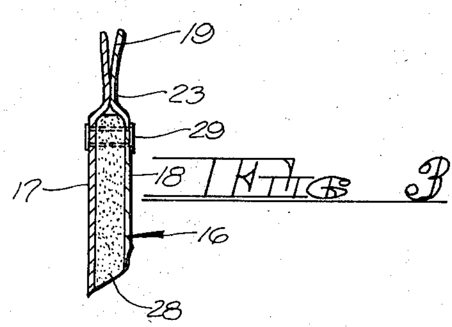
FIG. 3 is a fragmentary cross sectional view taken along the section line 3—3 of FIG. 2.

Attention is now called to FIGS. 1 through 3 wherein the protection unit of the present invention is generally indicated at 16. The protection unit comprises an inner layer or sheet 17 and an outer layer or sheet 18 both of substantially identical size and shape. The inner layer 17 may be of any suitable flexible, sturdy, plastic or fabric material. The outer layer may be of any appropriate, tough, upholstery material. Excellent results have been achieved, for example, when the outer layer 18 was made of 42 oz. finished weight coated fabric having a reinforced broken twill backing. Such materials are available, for example, from the Textileather Division of The General Tire and Rubber Company.

FIG. 2 is an elevational view of the protection unit and illustrates the layers 17 and 18 formed into an envelope having parallel top and bottom edges 19 and 20, respectively, and side edges 21 and 22 which slope slightly upwardly and inwardly. The layers 17 and 18 are joined inside their upper edges by a line of stitching 23 and inside their side edges by lines of stitching 24 and 25. Additional diagonal lines of stitching 26 and 27 are provided approximating the contour of the upper corners of the back supporting frame portions 2 through 4. It will be understood that the layers 17 and 18 may be joined by means other than stitching including electronic heat sealing.

As will be evident from FIG. 2, the envelope thus formed is open along its bottom edge. Into this envelope there is inserted a sheet or layer of energy absorbing material 28. Again, any appropriate energy absorbing material may be used. For example, excellent results have been achieved with type AA or type AH "Ensolite" a closed cell polyvinyl sponge manufactured by the Expanded Products Department of Uniroyal, Mishawaka, Ind. The sheet or layer of energy absorbing material 28 may have a thickness of from one-fourth in. to 1 in. Upon insertion of the energy absorbing layer 28 into the envelope, the protection unit is provided with a series of grommets 29 passing through the inner layer 17, the energy absorbing layer 28 and the outer layer 18. The grommets 29 are so positioned as to correspond to the perforations 14 in the seat back supporting portions 2 through 4 of the frame 1. The bottom edges of the inner and outer layers 17 and 18 of the protective unit are joined together by an additional series of grommets 30. Finally, the upper corners of the protection unit 16 may each be provided with a series of grommets 31.

Figure 4:
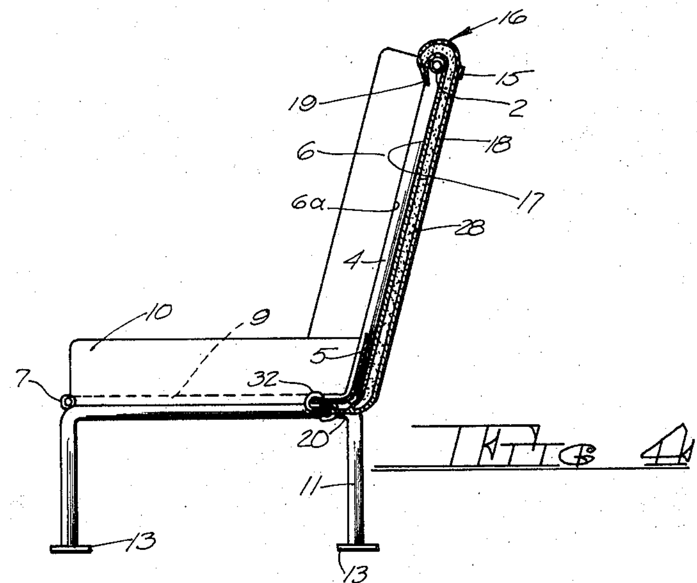
FIG. 4 is a side elevational view, partly in cross section, of the seat of FIG. 1 with the protective unit installed thereon.
Figure 5:
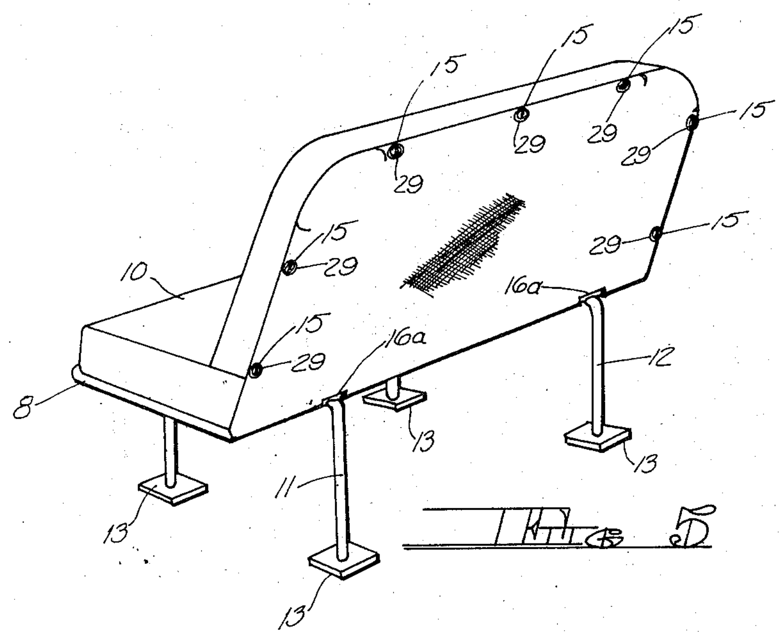
FIG. 5 is a perspective view illustrating the completed installation of FIG. 4.

Attention is now turned to FIGS. 1, 4 and 5. To accomplish the installation of the protective unit 16 on the seat frame 1, it is preferable to remove from the frame both the seat back 6 and the seat bottom 10, although installation may be made with the seat bottom 10 in place. When the seat back 6 has been removed, the screws 15 are inserted through the grommets 29 in the protection unit and through the perforations 14 in the seat back supporting portions 2 through 4 of the frame 1. These screws are then loosely engaged in the rear panel 6*a* of the seat back 6. The edge portions of the protection unit are then folded about the adjacent frame portions 2 through 4 so as to lie between these frame portions and the seat back panel 6*a*. The protection unit is so sized that those surfaces of the seat back supporting frame portions 2 through 4 not covered by the seat back 6, itself, will be covered by the protection unit 16 and its energy absorbing layer 28.

The grommets 31 in the upper corners of the protection unit 16 enable these upper corners to be temporarily engaged by ropes extending between the seat back supporting frame portions 2 through 4 and the seat back panel 6*a*. By pulling downwardly on the ropes, these corner portions may be pulled snugly about the rounded upper corners of the frame 1 at the juncture of portions 3 and 4 with the horizontal portion 2. This will assure both that these upper corners will be appropriately covered by the energy absorbing layer 28, and that these corners will have a nice appearance upon completion of the installation.

When the protection unit 16 is properly and fully located on the frame portions 2 through 4, the screws 15 are tightened to bring the seat back panel 6*a* tightly against the frame portions 2 through 4 and the protection unit edges trapped therebetween. This is illustrated in FIGS. 4 and 5, wherein like parts have been given like index numerals.

While it would be possible to provide the protection unit 16 with a lower edge located anywhere below the bottommost ones of the grommets 29, it is preferable to make the protection unit of such length that its bottommost edge may be brought beneath the horizontal rearward frame element 5 with the bottom edge of the energy absorbing layer 28 extending partially therebeneath, as illustrated in FIG. 4. When this is done, the bottommost edge of the protection unit may be affixed to the seat frame in any suitable manner. For purposes of an exemplary illustration, S-hooks 32 are shown engaged in the grommets 30 and hooked onto the forwardmost edge of the frame element 5. To accommodate for the leg elements 11 and 12, the bottom edge of the protection unit may be notched as at 16*a* (see FIGS. 1, 2 and 5).

From FIGS. 4 and 5 it will be evident that the protection unit 16 fully protects a student sitting in a similar seat behind the one illustrated not only from the upper horizontal frame portion 2, but also from the frame portions 3, 4, the element 5 and the rear panel 6*a* of the seat back 6. When a seat of the type illustrated incorporates a rear metallic panel (not shown) mounted to the frame elements 2 through 5, the student will be protected from it as well. By bringing the protection unit down beneath the rear horizontal element 5 of the seat frame, the student's knees, legs, ankles, shins and feet will be protected from injury.

Figure 6:
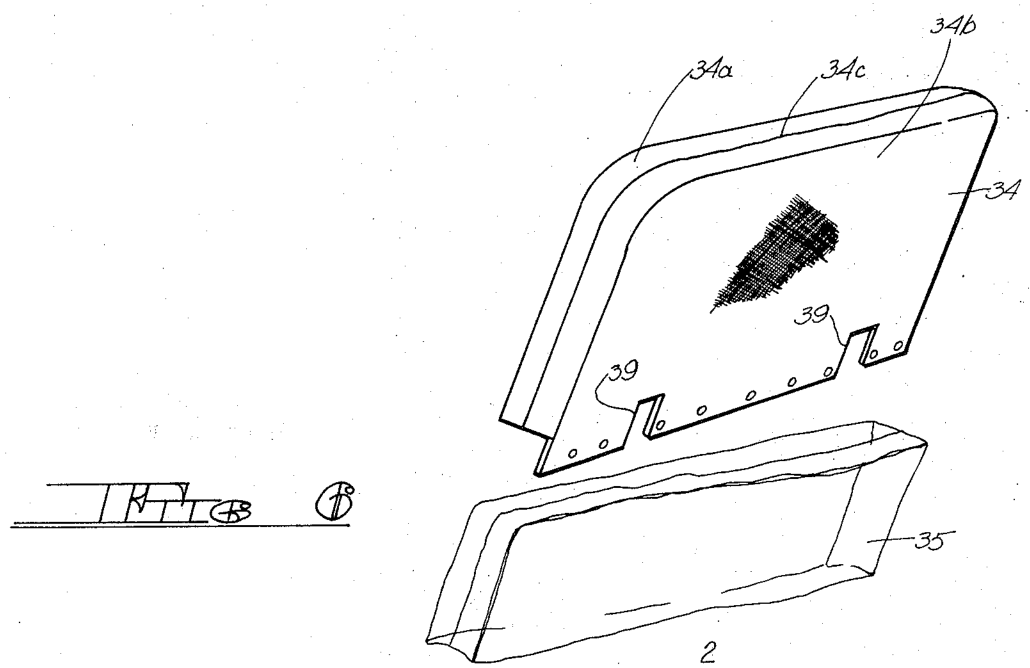
FIG. 6 is an exploded perspective view illustrating the conventional school bus seat of FIG. 1 and a second embodiment of the protective unit of the present invention.
Figure 7:
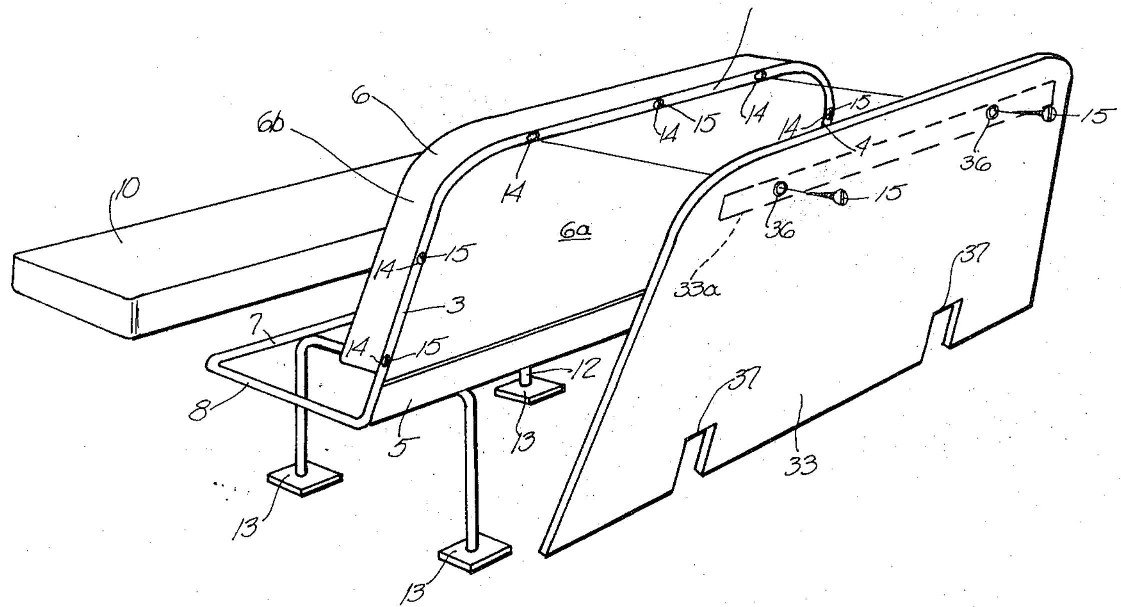
FIG. 7 is a perspective view illustrating the envelope of upholstery material of FIG. 6.
Figure 7:
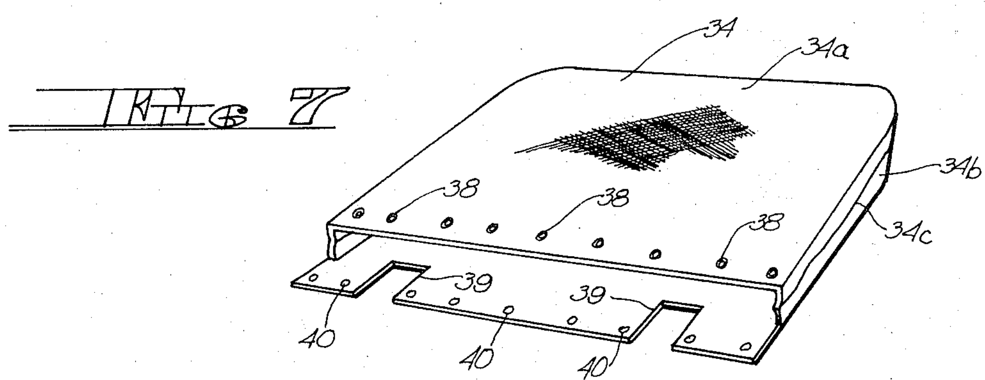
Figure 8:
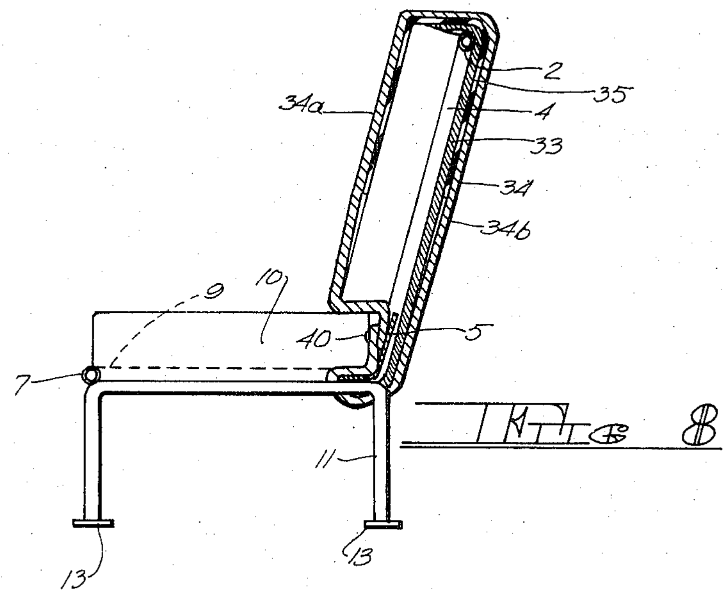
FIG. 8 is a side elevational view of the seat of FIG. 6, partly in cross section, and illustrating the protective unit fully assembled thereon.
Figure 9:
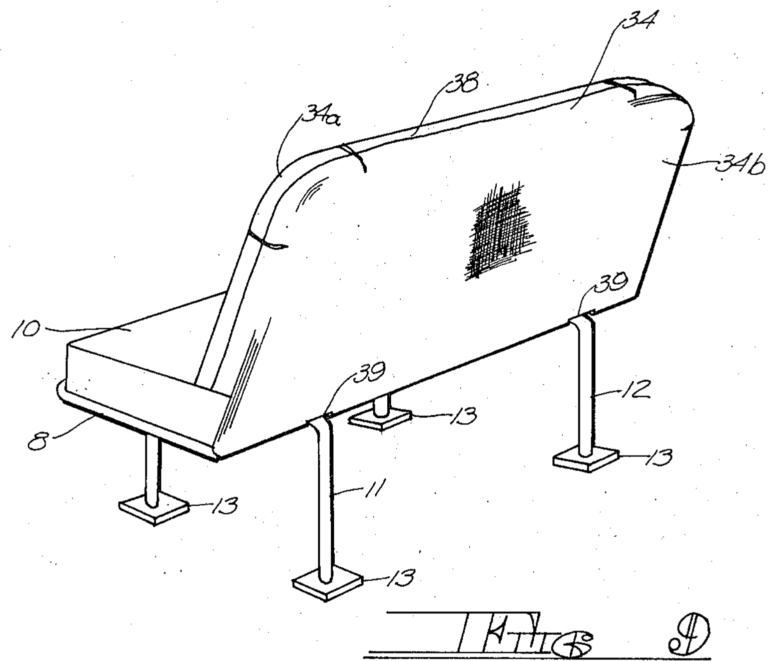
FIG. 9 is a perspective view illustrating the completed assembly of FIG. 8.

FIGS. 6 through 9 illustrate another embodiment of the protection unit of the present invention. In FIGS. 6, 8 and 9 a school bus seat, substantially identical to that shown in FIG. 1, is illustrated and like parts have been given like index numerals. This embodiment of the protection unit comprises a sheet or panel 33 of energy absorbing material, an envelope 34 of appropriate upholstery material and an optional envelope 35 of light gauge polyethylene material.

As will be evident from FIGS. 6 and 8 the sheet or layer 33 of energy absorbing material is so sized as to be somewhat larger than the area defined by frame portions 2 through 5. The sheet 33 may be made of the same material described with respect to the energy absorbing layer 28 in the embodiment of FIGS. 1 through 5.

The energy absorbing layer 33 is adapted to span the area enclosed by frame portions 2 through 4 and element 5 and to have its edges overlie these frame portions. In FIG. 8, for example, the upper edge of the layer 33 is shown as overlying frame portion 2 and the bottom edge of the layer is shown as extending beneath the frame element 5. It will be understood that the side edges of the layer 33 will similarly overlie frame portions 3 and 4. Means must be provided to hold the energy absorbing layer 33 in place during the installation of the protective unit. This may be accomplished in a number of ways. For example, a double coated adhesive tape may be applied to frame portion 2 (and frame portions 3 and 4 as well, if desired) or to the layer 33, itself, so that the layer 33 may simply be pressed in place. A strip of double coated adhesive tape is indicated in dashed lines at 33*a* in FIG. 6. Alternatively, a pair of grommets 36 may be located near the top edge of the layer 33 and in such position as to be engageable by a pair of the screws 15 which affix the seat back 6 to the seat frame. Finally, notches 37 may be formed in the lower edge of the energy absorbing layer 33 to accommodate for the leg elements 11 and 12.

In this embodiment, the seat back 6, frame elements 2 through 5 and energy absorbing layer 33 are adapted to be covered by an envelope 34. The envelope 34 is most clearly shown in FIGS. 6 and 7. The envelope comprises a front panel 34a and a rear panel 34b joined together along three sides by a line of stitching 34c. In this way, an envelope is formed having an open bottom end. Again electronic heat sealing may be used.

The envelope panels 34a and 34b may again be made of any appropriate, heavy-duty upholstery material such as those described with respect to the exterior layer 18 of FIG. 2. As is clearly shown in FIG. 7, the lower edge of front panel 34a of envelope 34 is provided with a row of fastening means. While any appropriate fastening means may be used, for purposes of an exemplary illustration, male snap fastener elements are shown at 38. The rear panel panel 34b is elongated, having a lower edge extending beyond the lower edge of the front panel 34a. The lower edge of rear panel 34b has notches 39 formed therein, corresponding to the notches 37 in the energy absorbing layer 33 and adapted to accommodate leg elements 11 and 12. Finally, the lower edge of rear panel 34b has a series of female snap fastener elements 40 arranged therealong and adapted to cooperate with the male snap fastener elements 38.

The envelope 34 is placed over the seat back 6, frame elements 2 through 5 and energy absorbing layer 33. While not required, it has been found advantageous to first place over these elements an intermediate envelope 35 of light gauge polyethylene material. The intermediate envelope 35 serves several purposes. First of all, it will assure that the peripheral edges of the energy absorbing layer 33 are properly overlying the frame elements 2 through 4. Secondly, it is important that the envelope 34 be so sized as to have a tight fit over the seat back 6, frame elements 2 through 5 and energy absorbing layer 33. Not only is this important so that the elements will remain properly in place, but also to provide a good appearance to the finished installation. Since the envelope 34 is intended to have a tight fit, some difficulty may be encountered in pulling it down over the seat back 6 and particularly the energy absorbing layer 33. The intermediate polyethylene envelope 35 will, in this instance, serve as a sort of "lubricating layer " for the application of envelope 34.

The installation of the protection unit of FIGS. 6 through 9 may be described as follows. The seat bottom 10 is first removed, followed by the removal of two of the screws 15 which affix the seat back 6 to the frame portion 2. The screws 15 are caused to pass through grommets 36 in the energy absorbing layer 33 and are then returned to their normal position through perforations 14 in the frame element 2 and into the panel 6a of seat back 6.

The polyethylene intermediate envelope 35 is then placed over seat back 6, frame elements 2 through 4 and the energy absorbing layer 33. A check is made that the side and top edges of the energy absorbing layer 33 are properly overlying frame portions 2 through 4 and then the envelope 34 is placed over the assembly.

Once the envelope 34 is fully seated on the assembly, the lower edge of the envelope back panel 34b is brought around the rear horizontal frame element 5 and the female snap fastener elements 40 are engaged upon the male snap fastener elements 38 along the lower edge of the envelope front panel 34a. This is clearly illustrated in FIG. 8. When the installation of the envelope 34 is complete, the seat bottom 10 may be remounted on the frame. With the seat bottom 10 in place, the snap fastener elements 38 and 40 are hidden and no longer accessible. As will be evident from FIGS. 8 and 9, the completed installation provides a neat, trim appearance and fully protects students sitting behind the seat structure in the same manner described with respect to the embodiment of FIGS. 1 through 5.

It will be understood by one skilled in the art that if in FIGS. 1, 3 and 4 the thickness of the inner and outer layers 18 have been exaggerated for purrposes of clarity. The same is true of the polyethylene envelope 35 and the panels 34a and 34b of envelope 34 in FIGS. 6 through 8.

Modifications may be made in the invention without departing from the spirit of it. It will be evident from the Figures and the description above that both embodiments of the present invention may be easily and rapidly installed and constitute an inexpensive means for bringing an existing school bus seat within the new safety requirements. Various school bus seats by various manufacturers differ one from another in certain construction features. For example, it is common for the upper corners of the bus seats, located along the aisle of the bus, to be provided with handle means. With minor modifications, well within the ability of one skilled in the art, both embodiments of the present invention may be applied to a wide variety of bus seats. All materials used in the practice of this invention are preferably treated to be fire retardant.

The embodiments of the invention in which an exclusive property or privilege is claimed are defined as follows:

1. A protection unit for a vehicle seat of the type comprising a metallic framework having portions supporting a seat back and a seat bottom, said framework portion supporting said seat back comprising at least an upper horizontal element extending along the upper rear edge of said seat back and downwardly depending frame elements extending along the rear side edges of said seat back, means to affix said seat back to said upper horizontal and downwardly depending frame elements, said upper horizontal and downwardly depending frame elements having forward surfaces covered by said seat back when affixed thereto, the remaining surfaces of said frame elements being exposed, said protection unit comprising a layer of energy absorbing material and an envelope made up of front and rear panels joined together about their top and side edges and open along their bottom edges, at least said rear panel of said envelope being made of tough upholstery material, said layer of energy absorbing material being located within said envelope, means to affix said envelope and said layer of energy absorbing material therein to said vehicle seat with said rear panel of said envelope facing rearwardly of said vehicle seat and said energy absorbing layer being located on the opposite side of said frame members from said seat back, said envelope and said energy absorbing layer therein being so sized as to span said frame elements and cover all exposed surfaces thereof.

2. The structure claimed in claim 1 wherein said layer of energy absorbing material comprises a sheet of closed-cell vinyl sponge having a thickness of from one-fourth to 1 inch.

3. The structure claimed in claim 1 wherein said vehicle seat frame includes a lower horizontal member below and beneath said seat back, the bottom edge of said energy absorbing layer and at least the bottom edge of said rear envelope panel extending below and beneath said lower horizontal member and means to hold said bottom edge of said energy absorbing layer and said bottom edge of said rear envelope panel in position.

4. The structure claimed in claim 1 wherein said envelope and said energy absorbing layer therein are located on the opposite side of said frame elements from said seat back, peripheral top and side edges of said envelope and said energy absorbing layer passing about said frame elements to a position wherein said peripheral top and side edges of said envelope extend between said seat back and said frame elements and means to hold said envelope and enclosed energy absorbing layer in place.

5. The structure claimed in claim 1 wherein said front panel of said envelope is made of tough upholstery material, said envelope being placed over said seat back and frame elements with said front panel overlying said seat back, said rear panel facing rearwardly of said vehicle seat and said energy absorbing layer being located on said opposite side of said frame elements from said seat back with the peripheral top and side edges of said energy absorbing layer overlying said frame elements.

6. The structure claimed in claim 4 wherein said seat back is affixed to said frame elements by mounting screws passing through said frame elements and into said seat back, said means to hold said envelope and enclosed energy absorbing layer in place comprising grommets provided in said envelope inset from said side and top edges thereof and passing through said panels and energy absorbing layer thereof, selected ones at least of said seat mounting screws passing through said envelope grommets as well as said frame elements and into said seat back.

7. The structure claimed in claim 4 wherein said layer of energy absorbing material comprises a sheet of closedcell vinyl sponge having a thickness of from one-fourth to 1 inch.

8. The structure claimed in claim 5 including means to affix said energy absorbing layer to said upper horizontal frame element, a layer of polyethylene located over said seat back, said frame elements and said energy absorbing layer whereby to facilitate installation of said envelope of upholstery material.

9. The structure claimed in claim 5 wherein said layer of energy absorbing material comprises a sheet of closed cell vinyl sponge having a thickness of from one-fourth to 1 inch.

10. The structure claimed in claim 5 wherein said vehicle seat frame includes a lower horizontal frame element below and beneath said seat back, the bottom edge of said front panel extending below said seat back and being provided with a plurality of snap fastener means therealong, the bottom edge of said energy absorbing layer extending below and beneath said lower horizontal frame element, the bottom edge of said rear panel extending below, beneath and around said lower horizontal frame element, said bottom edge of said rear panel having snap fastener means therealong and in engagement with said snap fastener means of said front panel.

11. The structure claimed in claim 6 wherein said vehicle seat frame includes a lower horizontal frame element below and beneath said seat back, said bottom edges of said front and rear envelope panels being joined together by a plurality of grommets located therealong and passing therethrough, said bottom edges of said envelope panels and the bottom edge of said energy absorbing layer extending below and beneath said lower horizontal frame element and being affixed thereto by a plurality of S-hooks engaging said last mentioned grommets and said lower horizontal frame element.

12. The structure claimed in claim 8 wherein said means to affix said energy absorbing layer to said upper horizontal frame element comprises a strip of double coated adhesive tape.

* * * * *